(12) United States Patent
Yamada et al.

(10) Patent No.: US 7,275,764 B2
(45) Date of Patent: Oct. 2, 2007

(54) VEHICLE OCCUPANT KNEE PROTECTION DEVICE

(75) Inventors: Takayuki Yamada, Wako (JP); Takashi Saso, Wako (JP); Yasuyuki Otsuka, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 11/065,952

(22) Filed: Feb. 25, 2005

(65) Prior Publication Data
US 2005/0194773 A1 Sep. 8, 2005

(30) Foreign Application Priority Data
Mar. 3, 2004 (JP) .............................. 2004-059664

(51) Int. Cl.
*B60R 21/045* (2006.01)

(52) U.S. Cl. .................................................. 280/752

(58) Field of Classification Search ................ 280/752, 280/751, 748, 753; 188/371, 377; 296/187.05
See application file for complete search history.

(56) References Cited

U.S. PATENT DOCUMENTS 5,273,314 A * 12/1993 Sakakibara ................. 280/752
5,865,468 A * 2/1999 Hur ............................ 280/752
6,866,294 B2 * 3/2005 Horsch et al. ............... 280/752
6,869,123 B2 * 3/2005 Marks et al. ................ 280/752

FOREIGN PATENT DOCUMENTS

JP 05-238338 9/1993
JP 09-066788 3/1997

* cited by examiner

*Primary Examiner*—Paul N. Dickson
*Assistant Examiner*—Robert Coker
(74) *Attorney, Agent, or Firm*—Rankin, Hill, Porter & Clark LLP (57) ABSTRACT

The present invention relates to a knee protection device for protecting the knees of an occupant when a vehicle collides. The protection device includes a knee protecting member which has a hollow cross-section outer frame composed of a front plate, a load-bearing plate, an upper plate and a lower plate, and a hollow cross-section inner frame integrally formed within the outer frame. The inner frame is integrally formed with the outer frame by connecting adjacent middle portions of the front plate, upper plate, load-bearing plate and lower plate, using plate-shaped ribs. Even if an action point on the load-bearing plate varies according to variation in height of the occupant's knee due to individual difference, impact energy is directly transmitted to the upper and lower plates as well as being dispersed and transmitted through the inner frame to the middle points of the upper, lower and front plates, efficiently received by the four plates constituting the outer frame, and thus the outer frame plastically deforms in a steady manner.

2 Claims, 8 Drawing Sheets

FIG.6A
(EXA.)

FIG.6B
(COMP.EXA.)

VEHICLE OCCUPANT KNEE PROTECTION DEVICE

FIELD OF THE INVENTION

The present invention relates to occupant knee protection devices for protecting the knees of an occupant in a collision of a vehicle.

BACKGROUND OF THE INVENTION

As part of occupant protection in a collision of a vehicle, a device configured to protect the knees of an occupant by absorbing impact energy acting on the knees is disclosed in Japanese Patent Laid-Open Publication Nos. HEI-9-66788 and HEI-5-238338, for example.

The occupant knee protection device disclosed in the HEI-9-66788 publication will be described with reference to FIG. 8 hereof.

Figure 8:
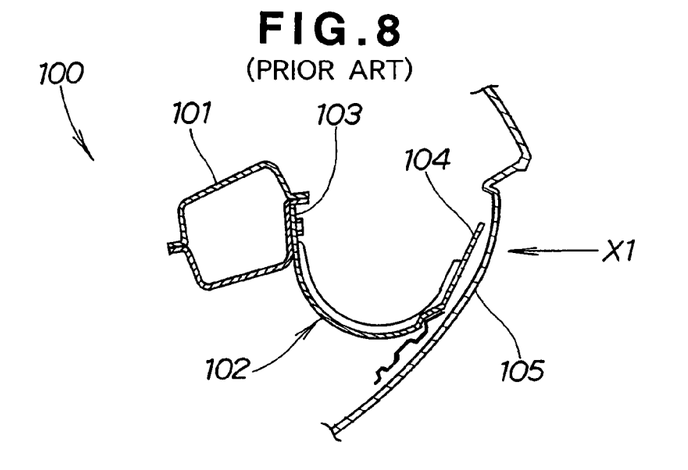
FIG. 8 is a schematic diagram of a first conventional occupant knee protection device.

A knee protection device 100 shown in FIG. 8 includes a knee protecting member 102 in a U shape in a side view, extending from a fixed bar 101 which extends transversely at the front of a vehicle body, toward a knee of an occupant seated (not shown). The knee protecting member 102 is a sheet-steel part with a proximal end portion 103 thereof attached to the fixed bar 101, and a distal end portion 104 forming a free end. The distal end portion 104 is opposite to the knee of the occupant with a lower instrument panel 105 there-between.

When impact energy acts on the front of the vehicle, the knee moves in the direction of arrow X1, striking the distal end portion 104 through the lower instrument panel 105. The U-shaped knee protecting member 102 deforms forward, absorbing impact energy acting on the knee, and thereby protecting the knee.

Figure 9A:
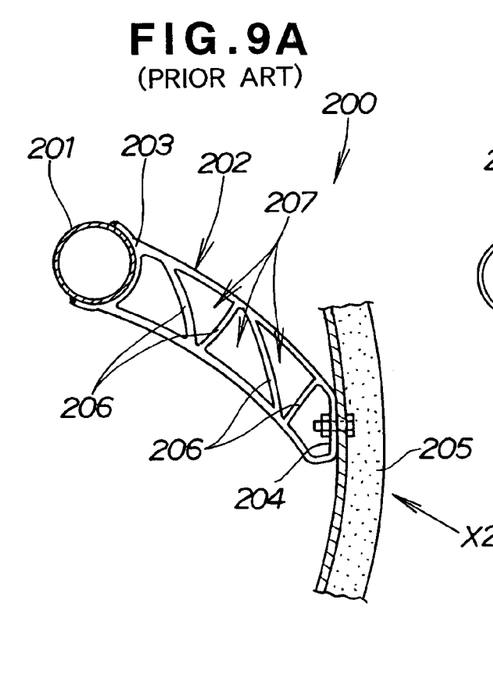
FIGS. 9A and 9B are schematic diagrams of a second conventional occupant knee protection device.
Figure 9B:
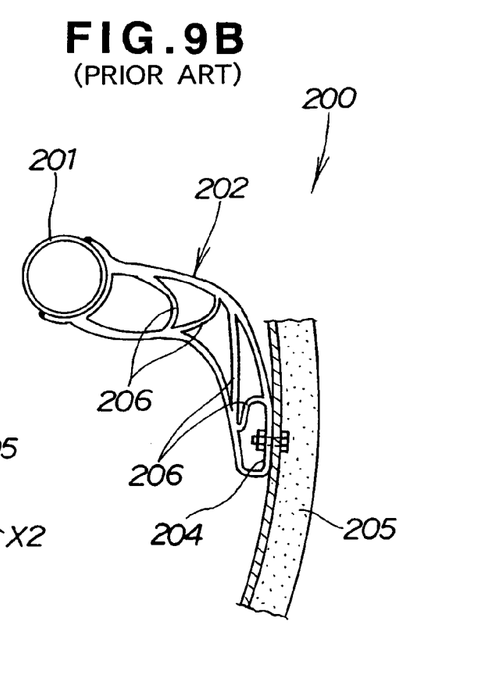

Next, the occupant knee protection device disclosed in the HEI-5-238338 publication will be described with reference to FIGS. 9A and 9B hereof FIG. 9A illustrates a state before a collision, and FIG. 9B illustrates a state after a collision.

A knee protection device 200 shown in FIG. 9A includes an elongated knee protecting member 202 extending rearward and downward from a fixed bar 201 which extends transversely at the front of a vehicle body, toward a knee of an occupant seated (not shown). A proximal end portion 203 of the knee protecting member 202 is attached to the bar 201, and a distal end portion 204 is fastened to a knee panel 205 with a bolt and nut. The distal end portion 204 is opposite to the occupant's knee with the knee panel 205 therebetween. The knee protecting member 202 is a hollow cross-section frame. The inside of the frame is divided by a plurality of ribs 206 and thus integrally formed with a plurality of inner frames 207 in a longitudinal direction.

When impact energy acts on the front of the vehicle, the knee moves in the direction of arrow X2, striking the distal end portion 204 through the knee panel 205. As a result, as shown in FIG. 9B, the knee protecting member 202 plastically deforms at its distal end side, absorbing impact energy acting on the knee, and thereby protecting the knee.

The knee protecting member 102 shown in FIG. 8 is disposed in front of the occupant's knee within a passenger compartment, and thus requires consideration to be given to its arrangement relative to interior parts around it such as an instrument panel and electrical components installed in the panel. Since the arrangement and shape of the interior parts are determined based on the perspective of overall vehicle design, it is preferred that design freedom be as great as possible.

It is required for the knee protecting member 102 to be provided with sufficient capability to absorb impact energy. The height of the occupant's knee varies greatly between individuals. Thus, the action point of impact energy on the distal end portion 104 of the knee protecting member 102 also varies up and down. Even when the action point varies as described above, it is required for the knee protecting member 102 to have sufficient capability to absorb impact energy. For this, it is conceivable to increase the size of the knee protecting member 102 in consideration of variation of the action point of impact energy. However, under the constraint that design freedom in the passenger compartment such as freedom in the arrangement and shape of interior parts should be ensured, there is a limit to the size of the knee protecting member 102, and more consideration is required.

The same is true for the knee protecting member 202 shown in FIGS. 9A and 9B.

For these reasons, there is a desire for an assembly that allows sufficient and stable energy absorbing performance to be provided irrespective of vertical variation of the action point of impact energy on a knee protecting member, and also allows reduction in size of the knee protecting member.

SUMMARY OF THE INVENTION

According to the present invention, there is provided a vehicle occupant knee protection device having a knee protecting member extending from a front portion of a vehicle body toward a knee of an occupant seated in a vehicle, the knee protecting member comprising: an outer frame having a hollow cross-sectional shape as viewed in side elevation, the outer frame including: a front plate provided on a front part side of the vehicle body such that a surface thereof is oriented in a forward direction of the vehicle; a load-bearing plate with a surface oriented toward the knee; a lateral upper plate connecting upper ends of the front plate and the load-bearing plate; and a lateral lower plate connecting lower ends of the front plate and the load-bearing plate; and an inner frame having a hollow cross-sectional shape as viewed in side elevation, the inner frame being integrally formed within the outer frame by integrally connecting, by means of bulkhead-shaped ribs, adjacent ones of a middle point of the front plate, a middle point of the upper plate, a middle point of the load-bearing plate and a middle point of the lower plate.

In this invention, as described above, adjacent ones of the middle points of the four plates (front plate, upper plate, load-bearing plate and lower plate) constituting the outer frame are connected by the bulkhead-like ribs, so that the four plates can support one another. In addition, impact energy acting from the knee on the load-bearing plate is not only directly transmitted to the upper and lower plates, but also dispersed and transmitted to the upper, lower and front plates through the inner frame.

When the occupant's knee height varies according to the individual's physique, the action point of impact energy acting on the load-bearing plate varies vertically. According to this invention, impact energy inputted through the action point into the load-bearing plate is directly transmitted to the upper and lower plates, and can also be dispersed and transmitted through the inner frame to the middle point of the upper plate, the middle point of the lower plate, and the middle point of the front plate. In addition, since the four plates support one another as described above, the knee protecting member has an increased tendency to maintain the hollow cross-sectional shape in a side view of the outer frame. Consequently, the impact energy acting on the load-bearing plate is efficiently received by the four plates constituting the outer frame, thus being efficiently received by the substantially entire knee protecting member, which can plastically deform correspondingly to the impact energy, absorbing the impact energy. Accordingly, regardless of vertical variation of the action point of impact energy on the knee protecting member, stable and sufficient energy absorbing performance can be provided. Also, the knee protecting member can be reduced in size.

Preferably, the upper plate and the lower plate each has a vertically waved shape. This formation of the upper and lower plates in wave shapes allows the outer frame to easily buckle when impact energy is applied from the knee to the load-bearing plate, thus increasing the absorption of the impact energy.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
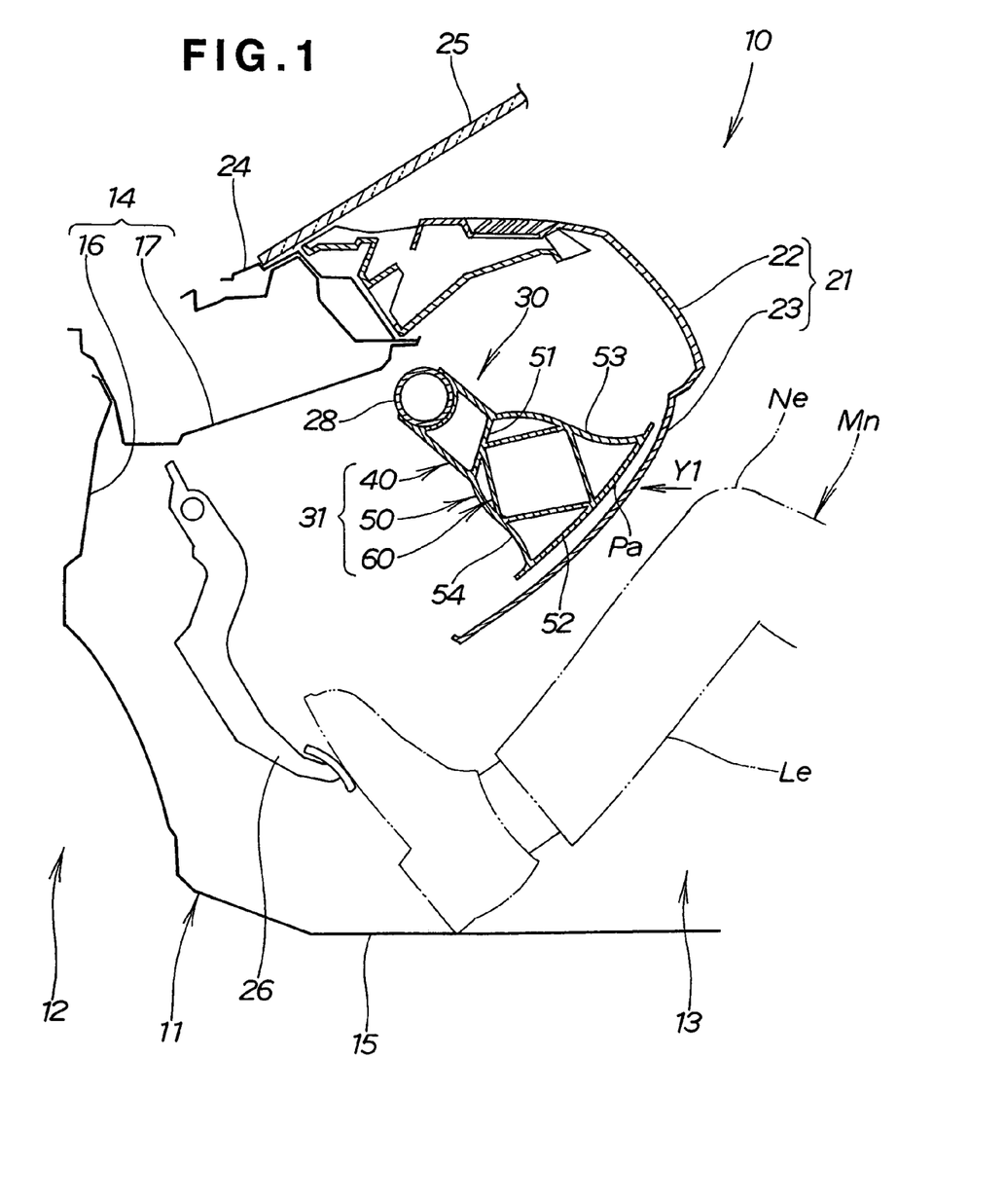
FIG. 1 is a schematic side view of a vehicle with an occupant knee protection device according to the present invention shown in cross-section mounted to a front portion in a passenger compartment.
Figure 2:
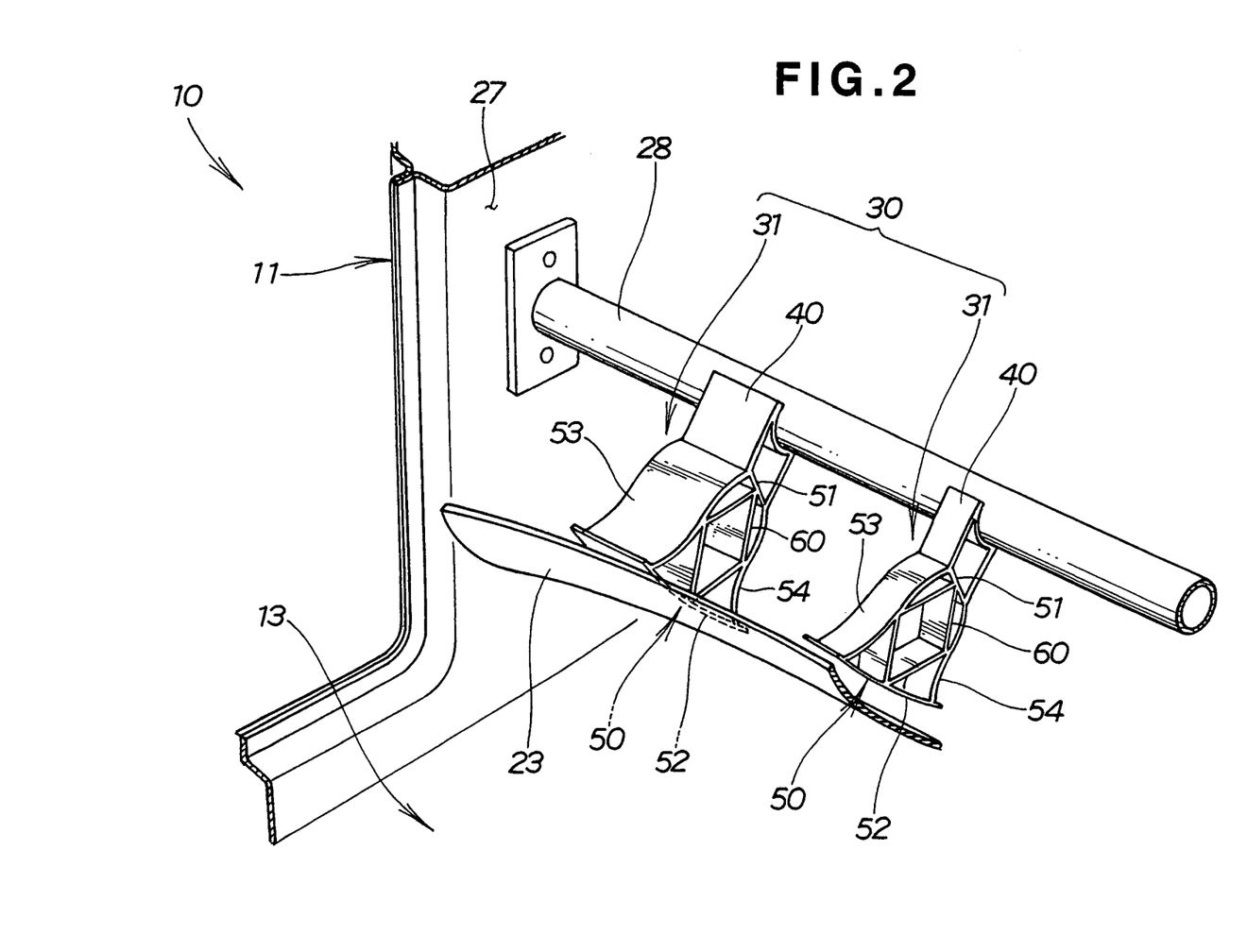
FIG. 2 is a perspective view of the front portion in the passenger compartment and the occupant knee protection device shown in FIG. 1.

Referring to FIGS. 1 and 2, a vehicle 10 is partitioned into an engine compartment 12 and a passenger compartment 13 by a dashboard 14 at the front of a vehicle body 11. A floor panel 15 is joined at its front end to the bottom of the dashboard 14. The dashboard 14 includes a lower dashboard 16 and an upper dashboard 17.

The vehicle 10 is further provided, in the front part of the passenger compartment 13, with an instrument panel 21 extending from the upper dashboard 17 toward a driver seat and a front passenger seat (not shown). The instrument panel 21 is provided with various instruments and the like. The instrument panel 21 includes an upper instrument panel 22 of the upper half and a lower instrument panel 23 of the lower half The lower instrument panel 23 is a plate material in a gentle arc shape protruding slightly toward a knee Ne when viewed from the side.

Reference numeral 24 denotes a windshield lower panel; 25, a windshield; and 26, a brake pedal.

A fixed bar 28 is extended between right and left A-pillars 27 (only the left one shown in FIG. 2). The fixed bar 28 is a bar-shaped fixed member such as a round pipe or a round bar extending horizontally and transversely, and is a stay fixed at its opposite ends to the right and left A-pillars 27 by bolting, welding or the like.

The vehicle 10 is a left-hand drive vehicle with a steering wheel and a drive seat arranged on the left, for example, and is provided with an occupant knee protection device 30 for protecting the right and left knees Ne (only one of them shown) of a driver Mn, or an occupant Mn shown in imaginary lines. The occupant knee protection device 30 is provided with a pair of right and left knee protecting members 31, 31 extending from the front of the vehicle body 11, specifically the fixed bar 28, toward the right and left knees Ne of the occupant Mn seated in the driver seat (in a rearward and downward direction). Reference sign Le denotes a leg of the occupant Mn.

Since there is a relatively large space between the left leg Le near a vehicle door and the vehicle door, the degree of freedom to laterally move the leg Le is great. Therefore, the left knee protecting member 31 corresponding to the left knee Ne is a member of a large width disposed in a position close to the side of the vehicle.

In contrast, since a center console box is located in a centerline position of the vehicle 10, the degree of freedom to laterally move the right leg Le of the occupant Mn is small. Therefore, the right knee protecting member 31 corresponding to the right knee Ne is a member of a small width disposed in a position close to the centerline of the vehicle.

As shown in FIG. 2, the lower instrument panel 23 has a gentle arc shape protruding forward at its transversely central portion when viewed from above. To conform to the contour of the lower instrument panel 23, the left knee protecting member 31 has a large longitudinal length and the right knee protecting member 31 has a small longitudinal length.

The right and left knee protecting members 31, 31 have the same configuration and have similar functions. Thus, hereinafter, only the left knee protecting member 31 will be described, and description of the right knee protecting member 31 will not be made.

Figure 3:
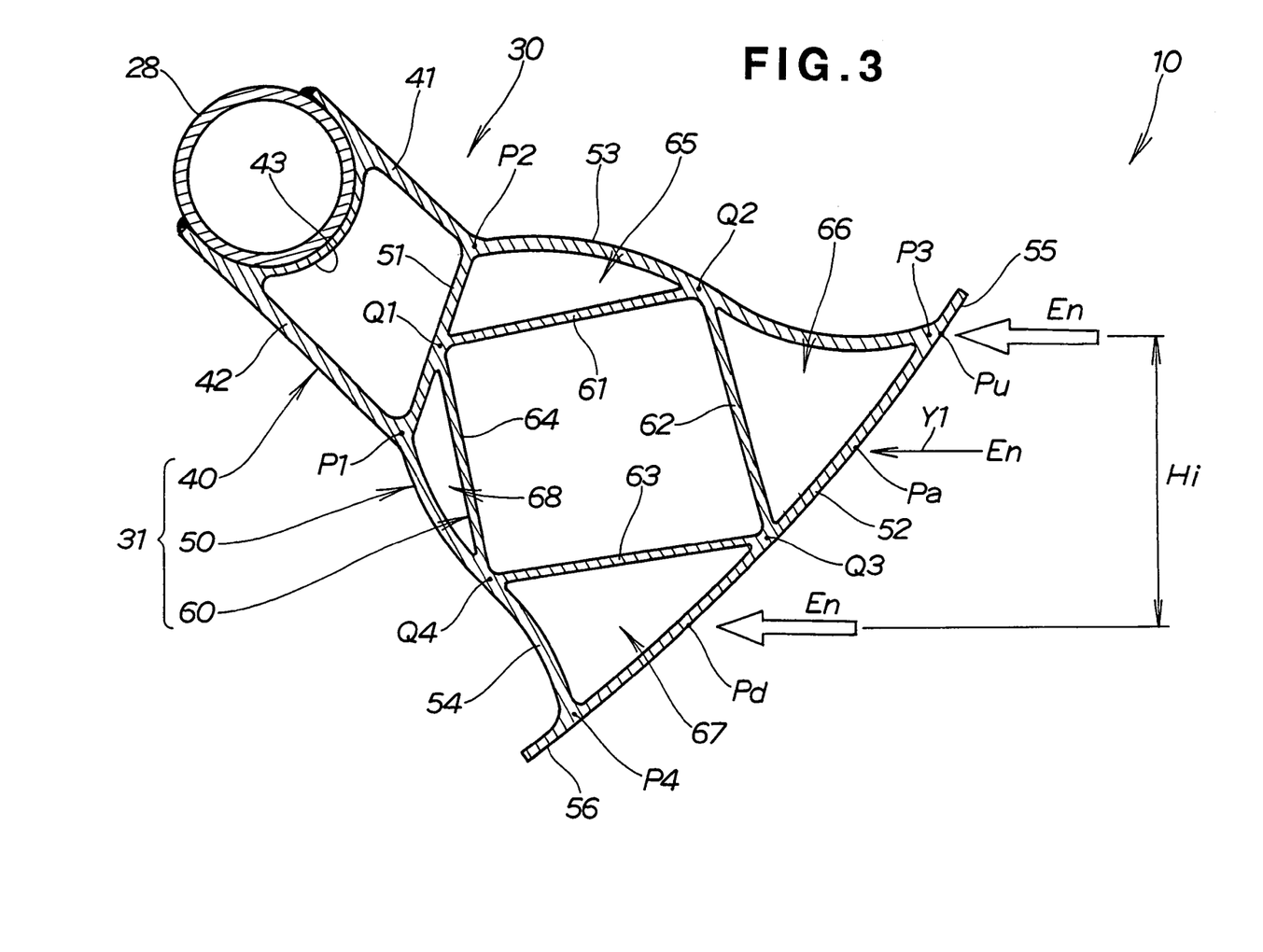
FIG. 3 is a cross-sectional view of a knee protecting member shown in FIG. 1.

FIG. 3 shows the knee protecting member 31 shown in FIG. 1.

As shown in FIGS. 1 and 3, the knee protecting member 31 is an integrally formed product, including a high-rigidity proximal end portion 40 to be fixed to the fixed bar 28, and a low-rigidity outer frame 50 extending from the proximal end portion 40 toward the knee Ne of the occupant Mn (that is, in a rearward and downward direction). The knee protecting member 31 is a member formed by cutting a lightweight alloy extrusion, which is elongate in a direction across the two sides of the sheet of FIG. 3, to a certain width as shown in FIG. 2, for example.

Impact energy acting from the knee Ne will be largely absorbed by deformation of the low-rigidity outer frame 50 as an energy absorber. Therefore, it can be said that the knee protecting member 31 is substantially comprised of the outer frame 50.

The proximal end portion 40 is an H-shaped member in a side view, including a pair of upper and lower legs (an upper leg 41 and a lower leg 42) extending from the periphery of the fixed bar 28 to the outer frame 50, and a connecting portion 43 connecting proximal portions of the upper and lower legs 41, 42. The proximal portions of the upper and lower legs 41, 42 are attached to the fixed bar 28 by welding, bolting, riveting or the like, whereby the knee protecting member 31 is fastened to the fixed bar 28. The upper and lower legs 41, 42 are horizontal-plate members parallel to each other when viewed from the side of the vehicle 10.

The outer frame 50 is a quadrangular hollow cross-section frame, including a front plate 51 located on the side of the vehicle body front portion, a load-bearing plate 52 located rearward of the front plate 51, an upper plate 53 at the top, and a lower plate 54 at the bottom.

The front plate 51 is a vertical-plate member with the surface oriented forward of the vehicle (or toward the proximal end portion 40), and is a flat plate connecting the distal ends of the upper and lower legs 41, 42.

The load-bearing plate 52 is a vertical-plate member with the surface oriented toward the knee Ne (see FIG. 1), and has a gentle arc shape slightly protruding toward the knee Ne when viewed from the side, being adjacent to the inner surface of the lower instrument panel 23 shown in FIG. 1 in a parallel relationship.

The upper plate 53 is a horizontal-plate member connecting the upper ends of the front plate 51 and the load-bearing plate 52. The lower plate 54 is a horizontal-plate member connecting the lower ends of the front plate 51 and the load-bearing plate 52.

Figure 4:
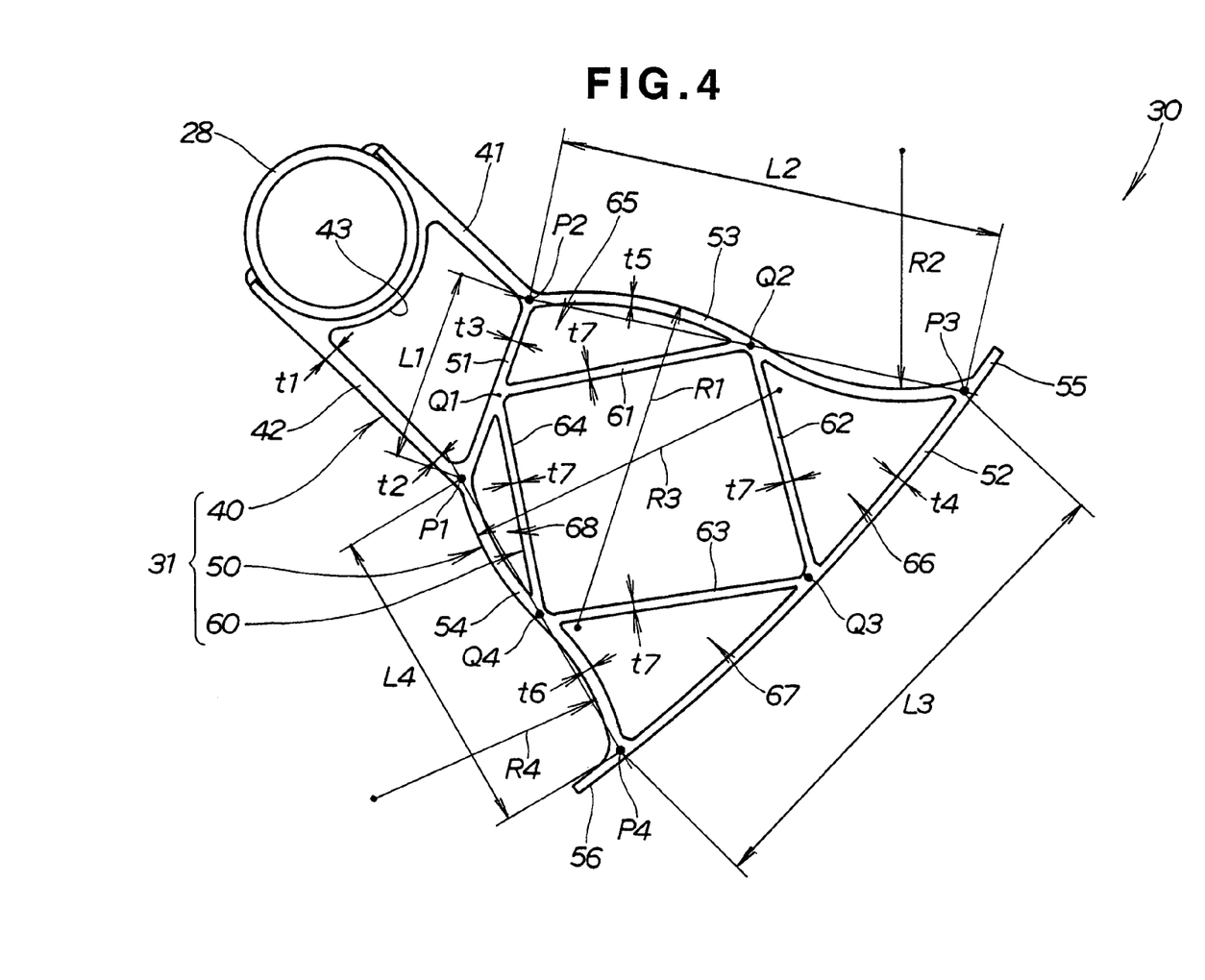
FIG. 4 is a diagram illustrating parts of the knee protecting member shown in FIG. 3.

FIG. 4 schematically illustrates functions and operations of the parts of the knee protecting member 31 shown in FIG. 3.

Referring to FIG. 4, the plate thickness t1 at the proximal ends of the upper and lower legs 41, 42 is greater than the plate thickness t2 at the distal ends thereof. That is, the upper and lower legs 41, 42 have tapered shapes narrowing from the proximal ends toward the front plate 51 of the outer frame 50. By contrast, in the outer frame 50, the plate thickness t3 of the front plate 51, the plate thickness t4 of the load-bearing plate 52, the plate thickness t5 of the upper plate 53, and the plate thickness t6 of the lower plate 54 are substantially the same as the plate thickness t2 at the distal ends of the upper and lower legs 41, 42.

As shown in FIG. 4, when the outer frame 50 is viewed from the side, a substantially middle point of the vertical dimension L1 of the front plate 51 (the dimension L1 between a point P1 and a point P2) is indicated by Q1; a substantially middle point of the longitudinal dimension L2 of the upper plate 53 (the dimension L2 between the point P2 and a point P3) by Q2; a substantially middle point of the vertical dimension L3 of the load-bearing plate 52 (the dimension L3 between the point P3 and a point P4) by Q3; and a substantially middle point of the longitudinal dimension L4 of the lower plate 54 (the dimension L4 between the point P4 and the point P1) by Q4.

The load-bearing plate 52 is large in the vertical dimension L3 so as to provide a vertically large action range of impact energy to act from the knee Ne (see FIG. 1). On the other hand, the front plate 51 can be small in the vertical dimension L1 because it only transmits impact energy acting on the load-bearing plate 52 to the fixed bar 28. Accordingly, the outer frame 50 has a funnel-like shape (a substantially trapezoidal shape) in a side view, expanding vertically from the proximal end portion 40 in a rearward and downward direction.

The load-bearing plate 52 includes an upper flange 55 extending upward of the upper point P3, and a lower flange 53 extending downward of the lower point P4. However, the presence or absence of these upper and lower flanges 55, 56 is optional.

The upper plate 53 has a gentle wave shape with a front half portion protruding upward and a rear half portion protruding downward. Specifically, the front half portion of the upper plate 53 has a circular arc shape of radius R1, and the rear half portion of the upper plate 53 has a circular arc shape of radius R2. The boundary between the front and rear circular arcs is located at the middle point Q2.

The lower plate 54 has a gentle wave shape with a front half portion protruding downward and a rear half portion protruding upward. Specifically, the front half portion of the lower plate 54 has a circular arc shape of radius R3, and the rear half portion of the lower plate 54 has a circular arc shape of radius R4. The boundary between the front and rear circular arcs is located at the middle point Q4.

The present invention is characterized in that bulkhead-like first to fourth ribs 61, 62, 63 and 64 connect adjacent middle points: the middle point Q1 of the front plate 51, the middle point Q2 of the upper plate 53, the middle point Q3 of the load-bearing plate 52, and the middle point Q4 of the lower plate 54, thereby integrally forming an inner frame 60 of a hollow cross-sectional shape in a side view within the outer frame 50.

The proximal end portion 40, the outer frame 50, and the inner frame 60, which constitute the knee protecting member 31, are integrally formed, thus eliminating the need for a joining step of joining these parts 40, 50 and 60 to one another by welding or the like. Therefore, the knee protecting member 31 can be manufactured at low cost.

The inner frame 60 formed by connecting the middle points of the sides of the trapezoidal cross-section outer frame 50 with the first to fourth ribs 61, 62, 63 and 64 has a substantially quadrangular shape. The ribs 61, 62, 63 and 64 are transversely extending flat plates. The plate thickness t7 of the ribs 61, 62, 63 and 64 is identical to or smaller than the plate thicknesses t3 to t6.

More specifically, (1) the adjacent middle points Q1 and Q2 are connected by the first rib 61, so that a substantially triangular first frame 65 with the points Q1, P2 and Q2 as vertices is formed in an upper front corner between the front plate 51 and the upper plate 53. As a result, the front plate 51 and the upper plate 53 support each other via the first rib 61.

(2) The adjacent middle points Q2 and Q3 are connected by the second rib 62, so that a substantially triangular second frame 66 with the points Q2, P3 and Q3 as vertices is formed in an upper rear corner between the upper plate 53 and the load-bearing plate 52. As a result, the upper plate 53 and the load-bearing plate 52 support each other via the second rib 62.

(3) The adjacent middle points Q3 and Q4 are connected by the third rib 63, so that a substantially triangular third frame 67 with the points Q3, P4 and Q4 as vertices is formed in a lower rear corner between the load-bearing plate 52 and the lower plate 54. As a result, the load-bearing plate 52 and the lower plate 54 support each other via the third rib 63.

(4) The adjacent middle points Q4 and Q1 are connected by the fourth rib 64, so that a substantially triangular fourth frame 68 with the points Q4, P1 and Q1 as vertices is formed in a lower front corner between the lower plate 54 and the front plate 51. As a result, the lower plate 54 and the front plate 51 support each other via the fourth rib 64.

Next, an operation of the knee protecting member 31 will be described with reference to FIGS. 1, 3 and 5.

Referring to FIG. 1, when impact energy acts on the front of the vehicle 10, the occupant Mn moves forward due to inertia. The knee Ne of the occupant Mn moves in the direction of arrow Y1, striking the load-bearing plate 52 through the lower instrument panel 23. As a result, impact energy En acts in a direction shown by arrow Y1 from the knee Ne on an upper action point Pa on the load-bearing plate 52 shown in FIG. 3.

Adjacent ones of the middle points Q1 to Q4 of the four plates (front plate 51, upper plate 53, load-bearing plate 52 and lower plate 54) constituting the outer frame 50 are connected by the bulkhead-like ribs 61 to 64 to integrally form the hollow cross-section inner frame 60 within the outer frame 50, so that the four plates 51 to 54 support one another. In addition, the impact energy En acting from the knee Ne on the load-bearing plate 52 is not only directly transmitted to the upper and lower plates 53 and 54, but also dispersed and transmitted to the upper, lower and front plates 53, 54 and 51 through the inner frame 60.

Figure 5:
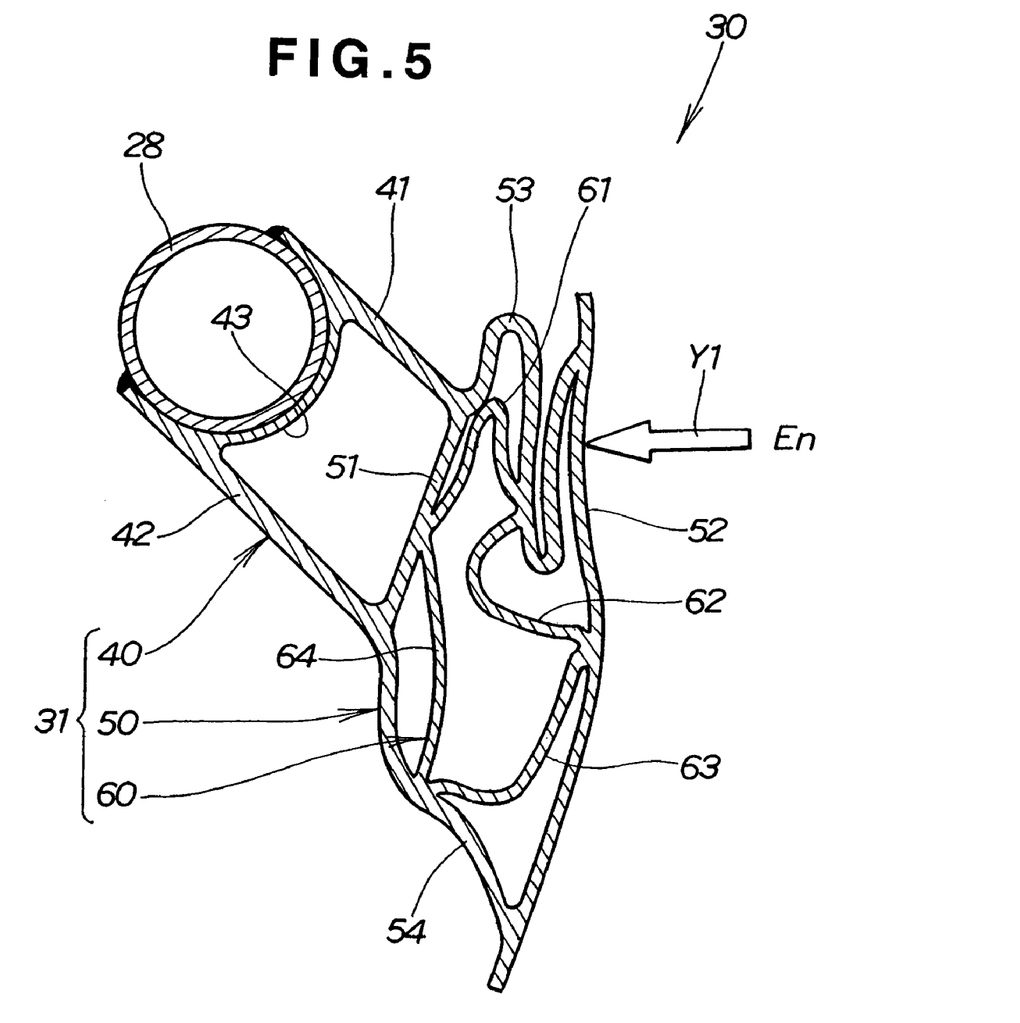
FIG. 5 is a diagram illustrating a plastically deformed state of an outer frame when impact energy acted on the knee protecting member.

Consequently, as shown in FIG. 5, the knee protecting member 31 deforms forward while receiving the impact energy En throughout the outer frame 50, thereby absorbing the impact energy En acting on the knee Ne (see FIG. 1) and protecting the knee Ne.

Generally, the height of the knee Ne of the occupant Mn shown in FIG. 1 varies according to the individual's physique. Therefore, as shown in FIG. 3, the action point of the impact energy En acting on the load-bearing plate 52 varies vertically in the action range Hi from an upper action point Pu to a lower action point Pd.

According to this invention, even if the action point Pa of the impact energy acting on the load-bearing plate 52 varies, the impact energy En received at this action point Pa is directly transmitted to the upper and lower plates 53 and 54, and is also dispersed and transmitted through the inner frame 60 to the middle point Q2 of the upper plate 53, the middle point Q4 of the lower plate 54, and the middle point Q1 of the front plate 51.

In addition, since the four plates 51 to 54 support one another, the knee protecting member 31 has an increased tendency to maintain the hollow cross-sectional shape of the outer frame 50. Consequently, the impact energy En acting on the load-bearing plate 52 is efficiently received by the four plates 51 to 54 constituting the outer frame 50. That is, the impact energy En is efficiently received by the substantially entire knee protecting member 31, and the knee protecting member 31 plastically deforms correspondingly to the impact energy En, absorbing the impact energy En.

Accordingly, regardless of vertical variation of the action point Pa of the impact energy En on the knee protecting member 31, stable energy absorption can be sufficiently provided. Also, since it is needless to increase the height dimension between the upper plate 53 and the lower plate 54, the knee protecting member 31 can be reduced in size and weight.

In addition, since the upper plate 53 and the lower plate 54 are in wave shapes, it is relatively easy for the outer frame 50 to plastically deform. The knee protecting member 31 easily starts plastically deforming by initial small impact energy En acting from the knee Ne.

Thus, the knee protecting member 31 easily starts plastically deforming by initial small impact energy En acting from the knee Ne, and thereafter also, plastically deforms gradually by substantially constant impact energy En. Accordingly, irrespective of vertical variation of the action point Pa of the impact energy En on the knee protecting member 31, the knee protecting member 31 continues steady absorption of the impact energy En speedily and continuously from the initial point of time when the impact energy En acts on the load-bearing plate 52.

Figure 6A:
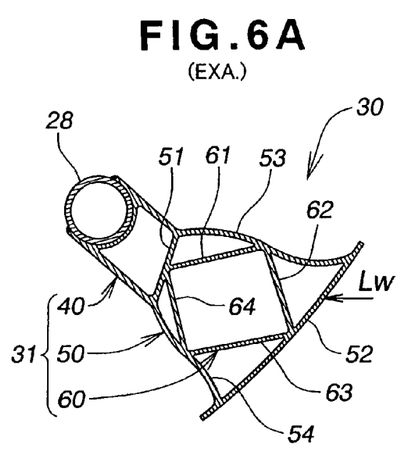
FIGS. 6A and 6B illustrate the present embodiment and a comparative example of a knee protecting member, respectively.
Figure 6B:
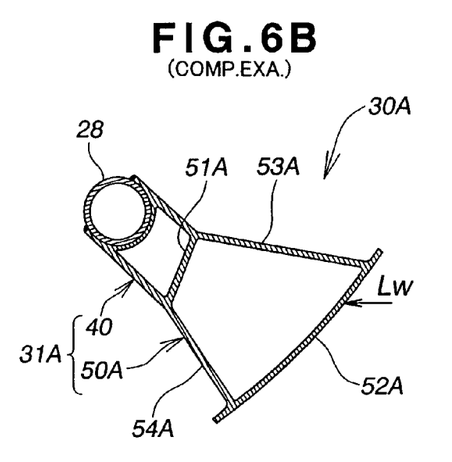
Figure 6C:
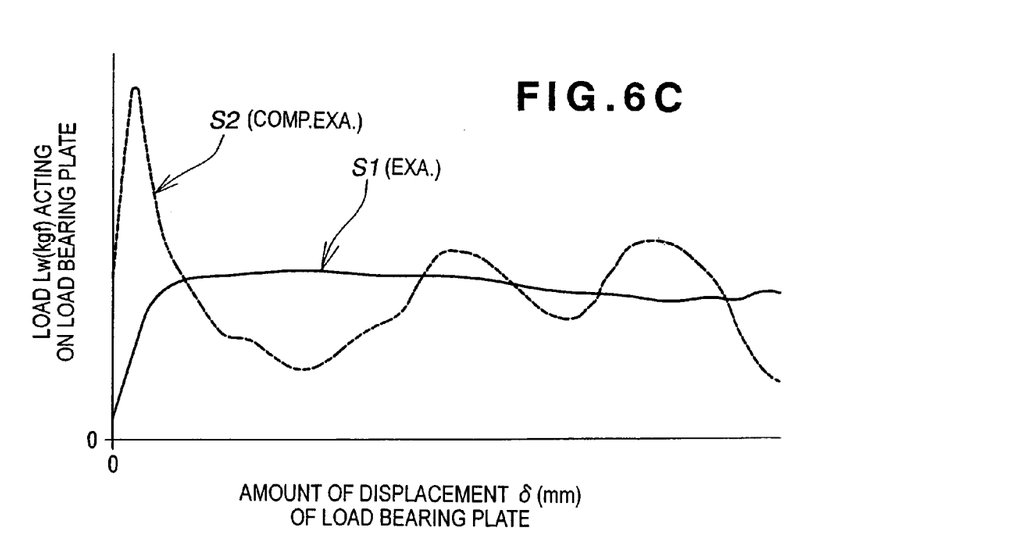
FIG. 6C is a graph illustrating load absorbing characteristics in the present embodiment and in the comparative example.

FIG. 6A illustrates the knee protecting member 31 in this embodiment while FIG. 6B illustrates a knee protecting member 31A in a comparative example; and FIG. 6C illustrates load absorbing characteristics of the knee protecting members 31 and 31A in the present embodiment and in the comparative example. In FIG. 6C, the vertical axis indicates a load Lw (kgf) acting on a load-bearing plate, and the horizontal axis indicates the amount of displacement δ (mm) of the load-bearing plate in relation to the load Lw. The solid line indicates a load absorbing characteristic curve S1 in this embodiment, and the broken line indicates a load absorbing characteristic curve S2 in the comparative example.

First, the configuration of the comparative example in FIG. 6B and the load absorbing characteristic curve S2 in the comparative example shown by the broken line in FIG. 6C will be described.

The knee protecting member 31A in the comparative example shown in FIG. 6B has a configuration in which an upper plate 53A and a lower plate 54A are flat plates, and the inner frame 60 in the embodiment shown in FIG. 6A is not provided. That is, the knee protecting member 31A in the comparative example consists of a proximal end portion 40 and an outer frame 50A. The outer frame 50A consists of a front plate 51A, a load-bearing plate 52A, the upper plate 53A and the lower plate 54A.

When a load Lw is applied to the load-bearing plate 52A, unstable characteristics are exhibited as shown by the load absorbing characteristic curve S2 in FIG. 6C, in which an initial maximum load Lw is too large for the knee protecting member 31A to plastically deform, and the subsequent load Lw rapidly decreases, and then fluctuates greatly.

Next, the embodiment shown in FIG. 6A and the load absorbing characteristic curve S1 in the embodiment shown by the solid line in FIG. 6C will be described.

The knee protecting member 31 in this embodiment shown in FIG. 6A is configured to include the wave-shaped upper and lower plates 53 and 54, and the inner frame 60. When a load Lw acts on the load-bearing plate 52, it results in the load absorbing characteristic curve S1 shown in FIG. 6C.

Specifically, according to this embodiment, since the upper and lower plates 53 and 54 are in vertically wavy wave shapes, it is relatively easy for the outer frame 50 to plastically deform. Therefore, an initial maximum load Lw required to plastically deform the knee protecting member 31 is small. Also, since the outer frame 50 is supported by the inner frame 60, the outer frame 50 can plastically deform while maintaining its overall shape to a certain extent. Accordingly, a load Lw remains small and steady when plastically deforming the knee protecting member 31.

As is clear from the above description, the knee protecting member 31 in this embodiment easily starts plastically deforming under an initial small load Lw, and thereafter also plastically deforms gradually under a substantially constant load Lw. As a result, the knee protecting member 31 steadily continues absorbing the load Lw speedily and continuously from the initial point of time when the load Lw acts on the load-bearing plate 52. This fact demonstrates that the knee protecting member 31 in this embodiment has excellent impact energy absorbing characteristics.

Figure 7:
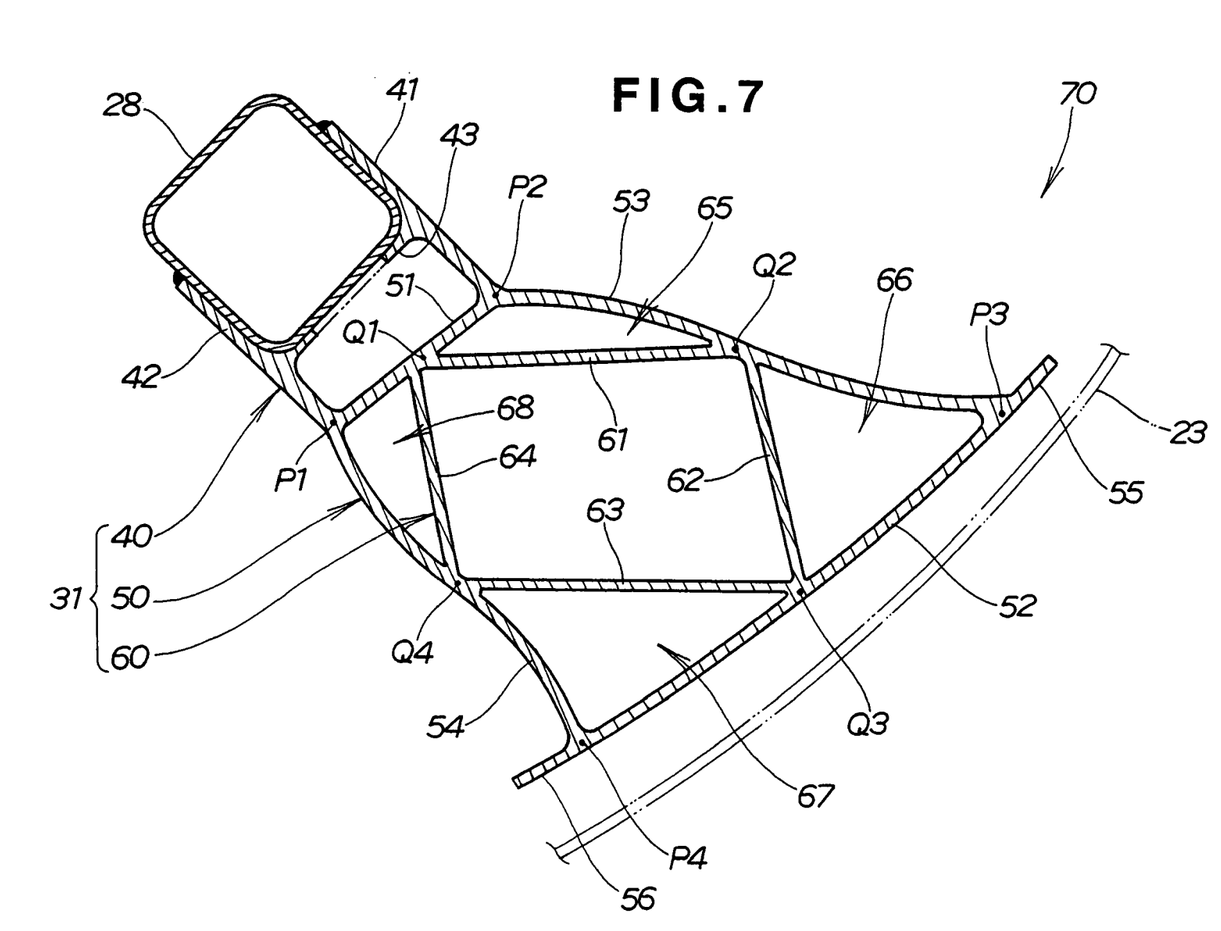
FIG. 7 is a cross-sectional view of an occupant knee protection device according to a modification of the present invention.

FIG. 7 illustrates a modified occupant knee protection device according to this invention. This modification is different from the embodiment in that the fixed bar 28 shown in FIG. 1 is modified to a square pipe, and the lower instrument panel 23 is modified in shape.

An occupant knee protection device 70 in this modification is characterized in that the proximal end portion 40 is modified in shape to conform to the fixed bar 28 of the square pipe, and the knee protecting member 31 is modified in the overall shape to conform to the shape of the lower instrument panel 23. Other components are the same as those in the embodiment shown in FIGS. 1 to 4, and are given the same reference numerals and will not be described.

The embodiment of the present invention can be applied to a right-hand drive vehicle in which a steering wheel and a driver seat are disposed on the right, by reversely arranging the right and left knee protecting members 31, 31.

As described above, the occupant knee protection device 30, 70 in the present invention is suitable to be used as an occupant protection device which further increases occupant protection performance when impact energy acts on a vehicle such as an automobile.

Obviously, various minor changes and modifications of the present invention are possible in the light of the above teaching. It is therefore to be understood that within the scope of the appended claims the invention may be practiced otherwise than as specifically described.

What is claimed is:

1. A vehicle occupant knee protection device having a knee protecting member extending from a front portion of a vehicle body toward a knee of an occupant seated in a vehicle, the knee protecting member comprising:

an outer frame having a hollow cross-sectional shape as viewed in side elevation, the outer frame including:

a front plate provided on a front part side of the vehicle body such that a surface thereof is oriented in a forward direction of the vehicle;

a load-bearing plate with a surface oriented toward the knee;

a lateral upper plate connecting upper ends of the front plate and the load-bearing plate; and a lateral lower plate connecting lower ends of the front plate and the load-bearing plate; and an inner frame having a hollow quadrangular cross-sectional shape as viewed in side elevation, the inner frame being integrally formed within the outer frame by integrally connecting ends of ribs directly to a middle point of the front plate, a middle point of the upper plate, a middle point of the load-bearing plate and a middle point of the lower plate, respectively.

2. The vehicle occupant knee protection device as set forth in claim 1, wherein each of the upper and lower plates has a vertically waved shape.

* * * * *